(12) United States Patent
Millhouse

(10) Patent No.: US 11,325,698 B2
(45) Date of Patent: May 10, 2022

(54) HYBRID UNMANNED AERIAL VEHICLE FOR DELIVERING CARGO

(71) Applicant: Walmart Apollo, LLC, Bentonville, AR (US)

(72) Inventor: Andrew B. Millhouse, Gilbert, AZ (US)

(73) Assignee: Walmart Apollo, LLC, Bentonville, AR (US)

(*) Notice: Subject to any disclaimer, the term of this patent is extended or adjusted under 35 U.S.C. 154(b) by 404 days.

(21) Appl. No.: 16/449,393

(22) Filed: Jun. 22, 2019

(65) Prior Publication Data

US 2020/0055596 A1 Feb. 20, 2020

Related U.S. Application Data

(60) Provisional application No. 62/711,332, filed on Jul. 27, 2018.

(51) Int. Cl.
*B64C 29/00* (2006.01)
*B64C 37/02* (2006.01)
(Continued)

(52) U.S. Cl.
CPC ............ *B64C 29/0025* (2013.01); *B64C 3/32* (2013.01); *B64C 9/323* (2013.01); *B64C 37/02* (2013.01);
(Continued)

(58) Field of Classification Search
CPC ........ B64C 2201/021; B64C 2201/104; B64C 2201/108; B64C 2201/128;
(Continued)

(56) References Cited

U.S. PATENT DOCUMENTS 3,088,694 A * 5/1963 Stirgwolt ............ B64C 29/0016
244/12.3
3,249,323 A * 5/1966 Vanderlip ........... B64C 29/0025
244/12.3
(Continued)

FOREIGN PATENT DOCUMENTS

DE 202018000429 U1 5/2018
GB 2555440 A 5/2018

OTHER PUBLICATIONS

Hochstenbach et al., "Design and Control of an Unmanned Aerial Vehicle for Autonomous Parcel Delivery with Transition from Vertical Take-Off to Forward Flight—VertiKUL, a Quadcopter Tailsitter", International Journal of Micro Air Vehicles, 2015, pp. 395-405, vol. 7, No. 4.
(Continued)

*Primary Examiner* — Medhat Badawi

(57) ABSTRACT

Disclosed herein are aspects of a hybrid unmanned aerial vehicle (UAV). In one embodiment, the hybrid UAV includes a fuselage configured to hold cargo, and at least one wing. The wing has a body that includes upper and lower surfaces and is configured to generate lift to enable the UAV to glide through the air. At least one rotor assembly is held within the body of the wing between the upper and lower surfaces of the wing. The upper and lower surfaces of the wing include upper and lower doors, respectively, extending above and below, respectively, the rotor assembly. The upper and lower doors are configured to be opened during gliding of the UAV to an open position that exposes the rotor assembly such that the rotor assembly is configured to draw air through the body of the wing and thereby generate lift.

16 Claims, 6 Drawing Sheets

(51) Int. Cl.
*B64C 9/32* (2006.01)
*B64C 3/32* (2006.01)
*B64C 39/02* (2006.01)

(52) U.S. Cl.
CPC ...... *B64C 39/024* (2013.01); *B64C 2201/021* (2013.01); *B64C 2201/104* (2013.01); *B64C 2201/108* (2013.01); *B64C 2201/128* (2013.01); *B64C 2201/206* (2013.01)

(58) Field of Classification Search
CPC .......... B64C 2201/206; B64C 29/0025; B64C 29/00; B64C 2201/082; B64C 29/0016; B64C 37/02; B64C 39/024; B64C 3/32; B64C 9/323; B64D 5/00
See application file for complete search history.

(56) References Cited

U.S. PATENT DOCUMENTS

| | | | | |
|---|---|---|---|---|
| 4,173,321 A * | 11/1979 | Eickmann | ............ | B64C 11/28 244/17.23 |
| 4,462,560 A * | 7/1984 | Earl | ............ | B64F 1/10 180/116 |
| 4,469,294 A * | 9/1984 | Clifton | ............ | B64C 29/0025 244/10 |
| 4,828,203 A * | 5/1989 | Clifton | ............ | B64C 29/0025 244/12.3 |
| 5,000,398 A * | 3/1991 | Rashev | ............ | B64C 27/08 244/110 E |
| 5,244,167 A * | 9/1993 | Turk | ............ | B64C 9/38 244/12.1 |
| 5,303,879 A * | 4/1994 | Bucher | ............ | B64C 29/0025 244/12.2 |
| 5,312,069 A * | 5/1994 | Bollinger | ............ | F02K 3/068 244/12.3 |
| 5,320,305 A * | 6/1994 | Oatway | ............ | B64C 29/0025 244/12.3 |
| 6,113,029 A * | 9/2000 | Salinas | ............ | B64C 39/064 244/12.6 |
| 6,170,778 B1 * | 1/2001 | Cycon | ............ | B64C 27/10 244/12.3 |
| 6,318,668 B1 * | 11/2001 | Ulanoski | ............ | B64C 29/0058 244/12.5 |
| 6,561,456 B1 * | 5/2003 | Devine | ............ | B64C 29/0025 244/12.1 |
| 7,059,566 B2 * | 6/2006 | Byers | ............ | B64D 5/00 244/119 |
| 7,267,300 B2 * | 9/2007 | Heath | ............ | B64C 15/14 244/12.3 |
| 7,338,010 B2 * | 3/2008 | Corder | ............ | B64C 3/56 244/3.24 |
| 7,398,946 B1 * | 7/2008 | Marshall | ............ | B60L 53/12 244/58 |
| 8,740,134 B2 * | 6/2014 | Suzuki | ............ | B64C 39/024 244/2 |
| 8,950,698 B1 * | 2/2015 | Rossi | ............ | B64C 29/0033 244/2 |
| 9,305,280 B1 * | 4/2016 | Berg | ............ | G08G 5/0069 |
| 9,845,150 B2 * | 12/2017 | Kroo | ............ | B64C 27/22 |
| 10,053,213 B1 * | 8/2018 | Tu | ............ | B64C 39/024 |
| 10,384,776 B2 * | 8/2019 | Choi | ............ | B64D 27/26 |
| 10,526,065 B2 * | 1/2020 | Thomassey | ............ | B64C 27/26 |
| D881,106 S * | 4/2020 | Parvizian | ............ | D12/319 |
| 10,710,713 B2 * | 7/2020 | Mia | ............ | B64C 29/0058 |
| 11,124,307 B2 * | 9/2021 | Murrow | ............ | B64D 31/06 |
| 11,124,308 B2 * | 9/2021 | Murrow | ............ | B64D 31/06 |
| 2003/0085319 A1 * | 5/2003 | Wagner | ............ | B64C 29/0025 244/12.3 |
| 2003/0098388 A1 * | 5/2003 | Walmsley | ............ | B64C 27/20 244/12.2 |
| 2004/0245374 A1 * | 12/2004 | Morgan | ............ | B64C 5/02 244/12.3 |
| 2008/0054121 A1 * | 3/2008 | Yoeli | ............ | B64C 29/0033 244/12.1 |
| 2009/0294573 A1 * | 12/2009 | Wilson | ............ | B64D 5/00 244/2 |
| 2010/0025523 A1 * | 2/2010 | Kutzmann | ............ | B64D 1/22 244/2 |
| 2015/0101478 A1 * | 4/2015 | Palmer | ............ | F41F 3/0406 89/1.82 |
| 2016/0009387 A1 * | 1/2016 | Kummer | ............ | B64C 29/0066 244/6 |
| 2016/0214717 A1 * | 7/2016 | De Silva | ............ | G05D 1/104 |
| 2016/0318609 A1 * | 11/2016 | Lynn | ............ | B64C 3/16 |
| 2016/0355261 A1 * | 12/2016 | Chin | ............ | B64C 39/024 |
| 2016/0368600 A1 * | 12/2016 | Frolov | ............ | B64C 39/10 |
| 2017/0001724 A1 * | 1/2017 | Yates | ............ | B64D 17/80 |
| 2018/0362154 A1 * | 12/2018 | Louis | ............ | B64C 27/30 |
| 2019/0196511 A1 * | 6/2019 | Millhouse | ............ | G01C 21/005 |
| 2019/0270517 A1 * | 9/2019 | Morgan | ............ | B64C 7/02 |
| 2019/0291860 A1 * | 9/2019 | Morgan | ............ | B64C 27/20 |
| 2020/0031460 A1 * | 1/2020 | Millhouse | ............ | B64C 39/024 |

OTHER PUBLICATIONS

Kolodny, "A test flight with Zipline, makers of humanitarian delivery drones", TechCrunch, https://techcrunch.com/2016/10/13/a-test-flight-with-zipline-makers-of-humanitarian-delivery-drones/, Oct. 14, 2016, 12 pages.

Thomas, S., "International Search Report", International Application No. PCT/US2019/38623, dated Sep. 11, 2019, 2 pages.

Thomas, S., "Written Opinion of the International Searching Authority", International Application No. PCT/US2019/38623, dated Sep. 11, 2019, 8 pages.

* cited by examiner

HYBRID UNMANNED AERIAL VEHICLE FOR DELIVERING CARGO

CROSS-REFERENCE TO RELATED APPLICATION

This application claims the benefit of U.S. Provisional Application No. 62/711,332, filed Jul. 27, 2018, entitled "Hybrid Unmanned Aerial Vehicle for Delivering Cargo", the entirety of which is hereby incorporated by reference herein.

BACKGROUND

Unmanned aerial vehicles (UAVs), sometimes referred to as drones, have been developed for a wide range of applications, such as photography, video photography, recreation, exploration, inspection, and other applications. One emerging application of UAVs is the delivery of cargo to a delivery destination. For example, UAVs are being developed to deliver retail and other products that have been purchased online directly to the customer's home or business. Many UAVs that are used to deliver cargo to delivery destinations are rotorcraft. But, rotorcraft may consume a relatively large amount of electrical power, particularly when carrying relatively heavy cargo. Accordingly, the electrical power consumed by the rotorcraft may decrease the efficiency of the rotorcraft and thereby decrease the range and/or increase the cost of delivery using UAVs.

SUMMARY

In one aspect, the disclosure provides a hybrid unmanned aerial vehicle (UAV). In one embodiment, the hybrid UAV includes a fuselage configured to hold cargo, and at least one wing extending outward from the fuselage. The wing has a body that includes a leading edge, a trailing edge, and upper and lower surfaces that extend from the leading edge to the trailing edge. The body of the wing has the shape of an airfoil such that the wing is configured to generate lift to enable the UAV to glide through the air. At least one rotor assembly is held within the body of the wing between the upper and lower surfaces of the wing. The upper surface of the wing includes an upper door extending above the rotor assembly and the lower surface of the wing comprises a lower door extending below the rotor assembly. The upper and lower doors are configured to be opened during gliding of the UAV to an open position that exposes the rotor assembly such that the rotor assembly is configured to draw air through the body of the wing and thereby generate lift.

In another aspect, the disclosure provides a cargo delivery system. In one embodiment, the cargo deliver system includes a mothership aerial vehicle and a hybrid unmanned aerial vehicle (UAV) configured to be held by the mothership aerial vehicle. The hybrid UAV includes a fuselage configured to hold cargo and at least one wing extending outward from the fuselage. The wing has a body that includes a leading edge, a trailing edge, and upper and lower surfaces that extend from the leading edge to the trailing edge. The body of the wing has the shape of an airfoil such that the wing is configured to generate lift to enable the UAV to glide through the air when released from the mothership aerial vehicle. At least one rotor assembly is held within the body of the wing between the upper and lower surfaces of the wing. The upper surface of the wing includes an upper door extending above the rotor assembly and the lower surface of the wing includes a lower door extending below the rotor assembly. The upper and lower doors are configured to be opened during gliding of the UAV to an open position that exposes the rotor assembly such that the rotor assembly is configured to draw air through the body of the wing and thereby generate lift.

In another aspect, the disclosure provides a method for delivering cargo. In one embodiment, the method includes releasing a hybrid unmanned aerial vehicle (UAV) from a mothership, wherein the hybrid UAV is configured to hold cargo. The method further includes gliding the hybrid UAV toward a destination using at least one wing of the hybrid UAV, opening upper and lower doors on the at least one wing of the hybrid UAV to expose at least one rotor assembly of the hybrid UAV such that the at least one rotor assembly is configured to generate lift, and flying the hybrid UAV to the destination using the at least one rotor assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Aspects of the disclosure provide a hybrid unmanned aerial vehicle (UAV) that includes a fuselage configured to hold cargo, and at least one wing. The wing has a body that includes upper and lower surfaces and is configured to generate lift to enable the UAV to glide through the air. At least one rotor assembly is held within the body of the wing between the upper and lower surfaces of the wing. The upper and lower surfaces of the wing include upper and lower doors, respectively, extending above and below, respectively, the rotor assembly. The upper and lower doors are configured to be opened during gliding of the UAV to an open position that exposes the rotor assembly such that the rotor assembly is configured to draw air through the body of the wing and thereby generate lift.

Embodiments shown and/or described herein may enable UAVs to consume less electrical power when delivering cargo to a delivery destination. Accordingly, embodiments shown and/or described herein may increase the efficiency of UAVs, which may increase the range of delivery and/or reduce the cost of delivery using UAVs.

Referring to the figures, examples of the disclosure enable a hybrid UAV, a cargo delivery system, and a method of delivering cargo.

Figure 1:
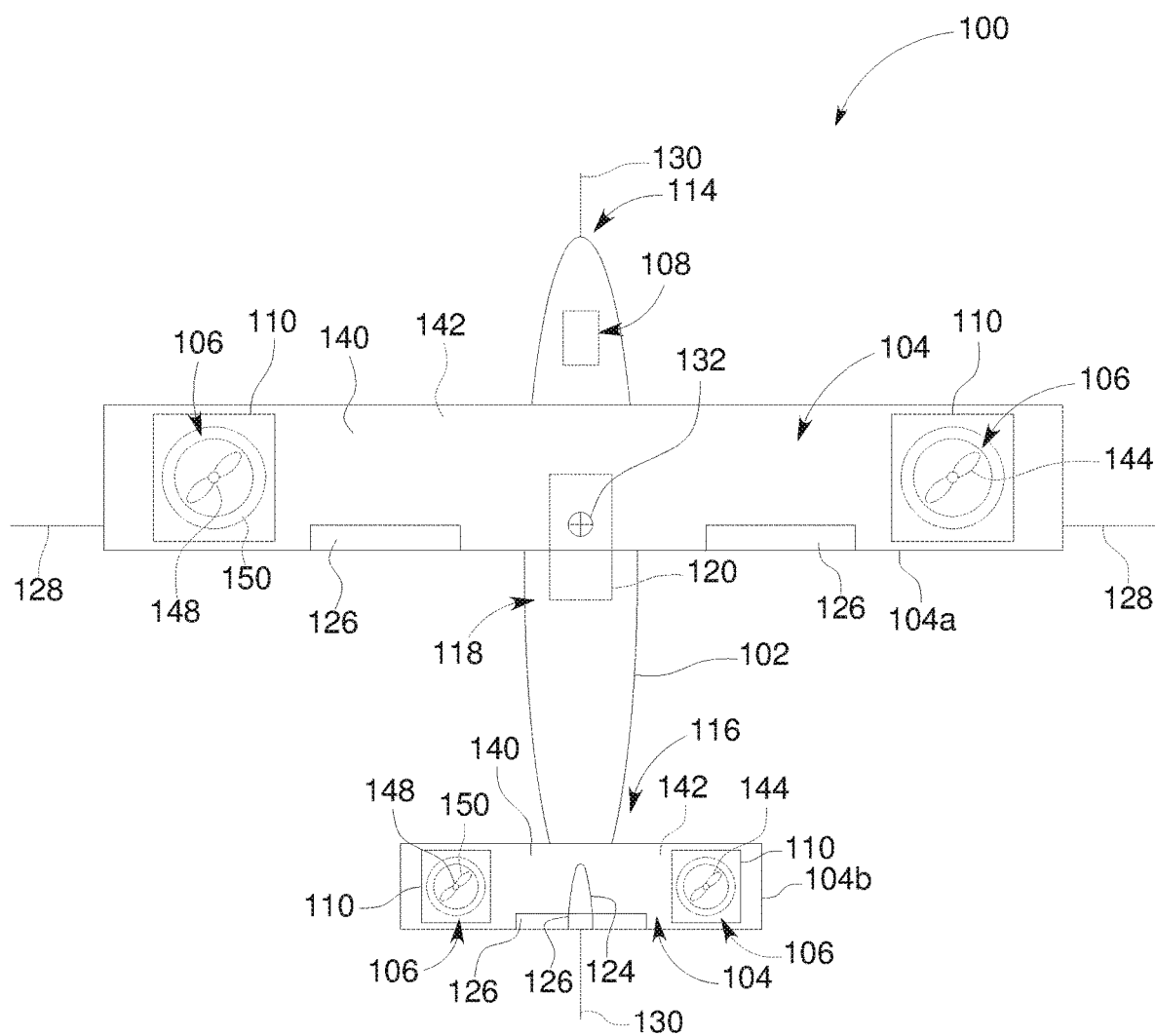
FIG. 1 is a plan view illustrating one embodiment of a hybrid unmanned aerial vehicle (UAV) according to principles of the disclosure.
Figure 2:
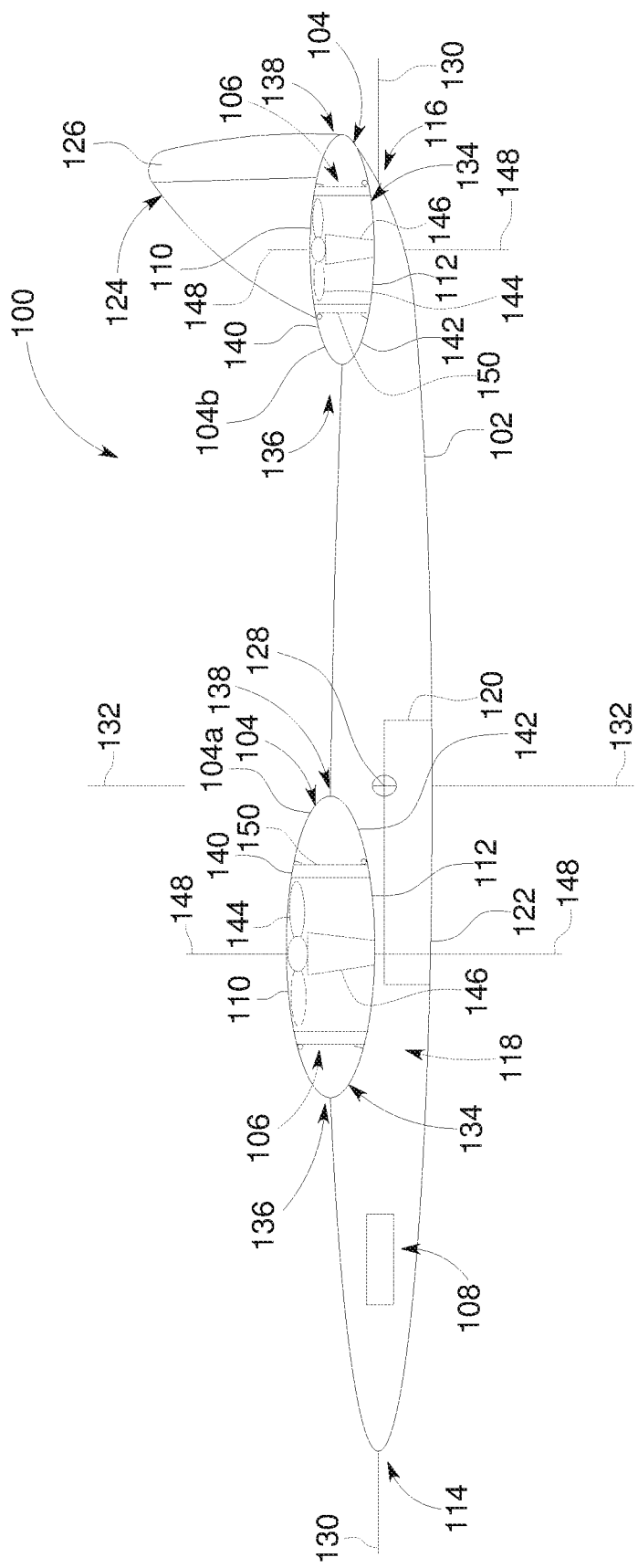
FIG. 2 is a side elevational view of the hybrid UAV shown in FIG. 1.

Referring now to FIGS. 1 and 2, there is shown one embodiment of a hybrid UAV 100. The hybrid UAV 100 includes a fuselage 102, one or more wings 104 that extend outward from the fuselage, one or more rotor assemblies 106 held within the wings 104, and a control system 108 for controlling flight of the hybrid UAV 100. The fuselage 102 is configured to hold cargo (e.g., a retail or wholesale product that is intended for delivery). The hybrid UAV 100 is capable of both gliding through the air using the wings 104 and flying through the air using the rotor assemblies 106. As will be described in more detail below, the wings 104 include upper doors 110 that extend above the rotor assemblies 106 and lower doors 112 (not visible in FIG. 1) that extend below the rotor assemblies 106. The upper and lower doors 110 and 112, respectively, can be opened to expose the rotor assemblies 106 and thereby transition the hybrid UAV 100 from gliding flight to flight using the rotor assemblies 106. FIGS. 1 and 2 illustrate the respective upper and lower doors 110 and 112 in a closed position of the doors 110 and 112 that is used while the hybrid UAV 100 is gliding through the air.

The fuselage 102 of the hybrid UAV 100 extends a length from a nose 114 to a tail 116. Optionally, the fuselage 102 is provided with an aerodynamic shape (e.g., a low drag shape, a shape that provides lift, etc.). The fuselage 102 includes an interior compartment 118 that holds the control system 108 therein. In the exemplary embodiment, the interior compartment 118 includes a cargo bay 120 that is configured to hold cargo for delivery to a destination. The cargo bay 120 may be configured to hold any cargo that is suitable for delivery. Examples of cargo held by the cargo bay 120 include, but are not limited to, retail or wholesale products (e.g., purchased online, over the telephone, or over facsimile), building, remodeling, and/or construction supplies, medical supplies, and/or the like. The cargo bay 120 may be isolated from other areas of the interior compartment 118 (e.g., using walls, partitions, etc.) to protect the cargo from other components of the hybrid UAV 100 that are held within the interior compartment 118 (e.g., the control system 108), and vice versa. In addition or alternatively to the cargo bay 120, the fuselage 102 may be configured to hold cargo on the exterior of the fuselage 102 (e.g., using a basket, an external box or other compartment mounted to the exterior of the fuselage, etc.).

Optionally, the hybrid UAV 100 includes one or more support legs (not shown) that are configured to support the hybrid UAV 100 on a surface (e.g., the ground, a roof, a landing pad, etc.). The support legs may be fixed to the exterior of the hybrid UAV 100 (e.g., the fuselage 102, the wings 104, etc.) or may be retractable to an interior of the hybrid UAV 100 (e.g., an interior of the fuselage 102, an interior the wings 104, etc.). When retractable, the support legs may be manually retractable and/or may be automatically retractable (e.g., the control system 108 may extend the support legs automatically before landing, the control system 108 may retract the support legs automatically after taking off, and/or the control system 108 may extend and/or retract the support legs upon being prompted by an individual using a button and/or other input device of the hybrid UAV 100). Suitable actuators (not shown, e.g., electric motors, hydraulic actuators, servos, solenoids, screw-type actuators, other linear actuators, etc.) may be provided to enable the control system 108 to automatically retract and/or extend the support legs.

The fuselage 102 may be constructed from any material(s) to facilitate supporting cargo having any weight. The size, shape, and/or the like of the fuselage 102, the interior compartment 118, and/or the cargo bay 120, as well as the material construction of the fuselage 102 and the lifting power of the wings 104 and/or the rotor assemblies 106, may be configured to carry a specific type of cargo or may be configured more generically to carry a variety of cargos having different sizes, shapes, and/or weights. Examples of material(s) that may be used to construct the fuselage 102 include, but are not limited to, a composite material (e.g., carbon fiber, fiberglass, Kevlar®, etc.), a plastic, aluminum, titanium, magnesium, fabric, sheet metal, and/or the like. In one example, the fuselage 102 has a frame structure (e.g., ribs, spars, stringers, etc.) that is covered with a skin (e.g., fabric, sheet metal, plastic, etc.).

Optionally, the fuselage 102 includes one or more cargo bay doors 122 (not visible in FIG. 1) that closes the cargo bay 120, for example to protect the cargo during flight of the hybrid UAV 100. The cargo bay door 122 may be manually operated and/or may be automatic. For example, an individual may manually open the cargo bay door 122 to retrieve cargo from within, or place cargo into, the cargo bay 120. In addition or alternatively to being manually operated, the control system 108 may automatically open and/or close the cargo bay door 122. For example, the control system 108 may automatically open the cargo bay door 122 upon arrival at a destination or upon being prompted by an individual (e.g., using a button and/or other input device of the hybrid UAV 100). Suitable actuators (not shown, e.g., electric motors, hydraulic actuators, servos, solenoids, screw-type actuators, other linear actuators, etc.) may be provided to enable the control system 106 to automatically open and close the cargo door 124. In one example, the tail 116 of the fuselage 102 is connected to the remainder of the fuselage 102 at a hinge (not shown) and can be opened to expose the cargo bay 120 (i.e., the tail 116 may function as the cargo bay door 122 in some examples).

In the exemplary embodiment, the hybrid UAV 100 includes a main wing 104a and a tail wing 104b. But the hybrid UAV 100 may include any other number and/or arrangement of the wings 104 that enable the hybrid UAV 100 to glide through the air. Optionally, the hybrid UAV 100 includes a vertical stabilizer 124. In the exemplary embodiment, the hybrid UAV 100 includes a conventional tail arrangement wherein a single vertical stabilizer 124 is extends vertically (e.g., with respect to the length of the fuselage 102) and the tail wing 104b extends outward from the fuselage 102. But, the hybrid UAV 100 may include any number of vertical stabilizer 124 and may have any other tail arrangement (e.g., a t-tail, a cruciform tail, a twin ail, a triple tail, a v-tail, a winglet tail, etc.). In some examples, the hybrid UAV 100 does not include a vertical stabilizer 124.

The hybrid UAV 100 includes one or more control surfaces 126 (e.g., rudders, ailerons, elevators, flaps, etc.) that are operatively connected to the control system 108 to enable the control system 108 to control the hybrid UAV 100 during gliding flight. Only some of the control surfaces 126 are visible in FIG. 2. In some examples, one or more of the control surfaces 126 is also used by the control system 108 to control flight of the hybrid UAV 100 using the rotor assemblies 106. Suitable actuators (not shown, e.g., electric motors, hydraulic actuators, servos, solenoids, screw-type actuators, other linear actuators, etc.) may be provided to enable the control system 108 to operate the control surfaces 126 to thereby control flight of the UAV 100.

The control surfaces 126 may enable the hybrid UAV 100 to move about any number of degrees of freedom, such as, but not limited to, one or more, two or more, three or more, four or more, five or more, six or more, and/or the like. The control surfaces 126 may enable the hybrid UAV 100 to rotate about any number of axes of rotation (e.g., a pitch axis 128, a roll axis 130, and/or a yaw axis 132). The hybrid UAV 100 may move along any number of dimensions, for example along an X axis that is approximately parallel to the pitch axis 128, a Y axis that is approximately parallel to the roll axis 130, and a Z axis that is approximately parallel to the yaw axis 132.

Referring now solely to FIG. 2, each wing 104 of the hybrid UAV 100 includes a body 134 that has the shape of an airfoil such that the wing 104 is configured to generate lift. The body 134 extends a chord length from a leading edge 136 to a trailing edge 138. The body 134 includes an upper (i.e., suction) surface 140 and a lower (i.e., pressure) surface 142 that each extend from the leading edge 136 to the trailing edge 138. The upper door 110 defines at least a portion of the upper surface 140 of the body 134 of the wing 104 in the closed position, while the lower door 112 defines at least a portion of the lower surface 142 of the wing body 134 in the closed position. Each rotor assembly 106 is held within the body 134 of a corresponding wing 104 at least partially between the upper surface 140 and the lower surface 142. In the closed position shown in FIG. 2, the upper door 110 extends above the rotor assembly 106 and the lower door 112 extends below the rotor assembly 106.

The specific airfoil shape of wings 104 that is shown herein is meant as exemplary only. Each wing 104 may include any other airfoil shape that enables the hybrid UAV 100 to glide through the air. The size, airfoil shape, and/or the like of each wing 104 may be selected to provide a predetermined aerodynamic performance (e.g., drag coefficient, amount of lift, etc.), for example to provide a predetermined gliding performance (e.g., aerodynamic efficiency, etc.) and/to facilitate carrying a specific type of cargo and/or a variety of cargos having different sizes, shapes, and/or weights.

Examples of material(s) that may be used to construct the wings 104 include, but are not limited to, a composite material (e.g., carbon fiber, fiberglass, Kevlar®, etc.), a plastic, aluminum, titanium, magnesium, fabric, sheet metal, and/or the like. In one example, one or more of the wings 104 has a frame structure (e.g., ribs, spars, stringers, etc.) that is covered with a skin (e.g., fabric, sheet metal, plastic, etc.). In other examples, one or more of the wings 104 has a hollow structure, a solid structure, or a hollow structure that is filled with another material (e.g., a foam, etc.).

Referring again to FIGS. 1 and 2, the rotor assemblies 106 include propellers 144 that rotate to generate lift and/or thrust for the hybrid UAV 100 and thereby move (i.e., fly, propel, etc.) the hybrid UAV 100 through the air. Each rotor assembly 106 includes an electric motor 146 (not visible in FIG. 1) that is connected to the corresponding propeller 144 such that the electric motor 146 drives rotation of the corresponding propeller 144. In addition or alternatively, other actuators (e.g., a combustion engine, etc.) may be used to drive rotation of the propellers 144. Operation of the electric motors 146 are controlled by the control system 108 to control flight of the hybrid UAV 100. In addition, or alternative to the electric motors 146, the propeller 144 of one or more of the rotor assemblies 106 may be fabricated from an electrically conductive material (e.g., an epoxy-filled carbon fiber fabric, an epoxy-filled titanium fabric, a metal, etc.) and a cage 150 of the rotor assembly 106 that surrounds the propeller may be connected to an electrical power source to act as a coil that drives rotation of the propeller 144.

To affect the motion of the hybrid UAV 100 through the air, the propeller 144 of each rotor assembly 106 may rotate at approximately the same rate of rotation as compared other rotor assemblies 106 (to thereby generate approximately the same amount of lift and/or thrust) and/or may rotate at a different rate of rotation as compared to other rotor assemblies 106 (to thereby generate a different amount of lift and/or thrust). For example, the propeller 144 of one or more rotor assemblies 106 may rotate at a different rate of rotation as compared to one or more other rotor assemblies 106 to change the orientation of (e.g., rotate) the UAV 100.

The propellers 144 of the rotor assemblies 106 rotate about axes of rotation 148. The axes of rotation 148 may be arranged approximately parallel to each other, as is shown in FIGS. 1 and 2. In one example, the axis of rotation 148 of the propeller 144 of one or more of the rotor assemblies 106 is fixed at, or selectively moveable to (for example using the control system 108), a non-parallel angle relative to the axis of rotation 148 of one or more other rotor assemblies 106, for example to affect the motion of the hybrid UAV 100.

The rotor assemblies 106 may enable the hybrid UAV 100 to move about any number of degrees of freedom, such as, but not limited to, one or more, two or more, three or more, four or more, five or more, six or more, and/or the like. The rotor assemblies 106 may enable the hybrid UAV 100 to rotate about any number of axes of rotation (e.g., the pitch axis 128, the roll axis 130, and/or the yaw axis 132). The hybrid UAV 100 may move along any number of dimensions, for example along an X axis that is approximately parallel to the pitch axis 128, a Y axis that is approximately parallel to the roll axis 130, and a Z axis that is approximately parallel to the yaw axis 132. The rotor assemblies 106 of the hybrid UAV 100 may enable the hybrid UAV 100 to take off and/or land vertically.

Although the exemplary embodiment of the hybrid UAV 100 includes four rotor assemblies 106 (sometimes referred to as a "quadcopter"), the hybrid UAV 100 may include any number of rotor assemblies 106, such as, but not limited to, one, two, three, four, five, six, seven, eight, or more rotor assemblies 106. One alternative example of the hybrid UAV 100 is a helicopter arrangement that includes one or more main rotor assemblies 106 and one or more control rotor assemblies 106. For example, the hybrid UAV 100 may include a main rotor assembly 106 in the fuselage 102 (e.g., that may be covered and exposed with doors similar to the doors 110 and 112 described herein) and a control rotor assembly 106 in the vertical stabilizer 124 (e.g., that may be covered and exposed with doors similar to the doors 110 and 112 described herein). In one example, the hybrid UAV 100 includes one or more rotor assemblies 106 in the fuselage 102 that are covered and exposed with doors similar to the doors 110 and 112 described herein but does not include any rotor assemblies 106 in the wings 104 (and may not include any rotor assemblies 106 in the vertical stabilizer 124).

The control system 108 includes various components for controlling the flight and/or other operations of the hybrid UAV 100. For example, the control system 108 may include a flight control unit, one or more navigation units (e.g., a global positioning system (GPS), etc.), one or more communication units (e.g., wireless communication unit, cellular communication units, radio communication units, etc.), one or more sensors, one or more electrical power units, and/or the like. Examples of sensors of the hybrid UAV 100 include, but are not limited to, vision and/or image sensors (e.g., imaging devices capable of detecting visible, infrared, and/or ultraviolet light, night vision cameras, other cameras, radar, sonar, etc.), location sensors (e.g., GPS sensors, mobile device transmitters enabling location triangulation, etc.), proximity and/or range sensors (e.g., ultrasonic sensors, lidar, time-of-flight and/or depth cameras, etc.), inertial sensors (accelerometers, gyroscopes, magnetometers, inertial measurement units, etc.), altitude sensors, attitude sensors (e.g., compasses, etc.), pressure sensors (e.g., barometers), audio sensors (e.g., microphones, etc.), field sensors, (e.g., magnetometers, electromagnetic sensors, etc.), WiFi sensors, and/or the like.

The control system 108 of the hybrid UAV 100 may enable the hybrid UAV 100 to operate autonomously. For example, the hybrid UAV 100 may be capable of autonomously flying to a destination to deliver cargo to the destination and/or pickup cargo from the destination for delivery to another destination. The hybrid UAV 100 may operate autonomously by following a set of pre-programmed instructions, for example. In one example, the hybrid UAV 100 may be controlled using a remote controller (not shown) and/or by a mothership aerial vehicle (e.g., the mothership aerial vehicle 384 shown in FIG. 8) that communicates with the UAV 100 wirelessly. In combination with a remote controller and/or a mothership aerial vehicle, the control system 108 of the hybrid UAV 100 may enable the hybrid UAV 100 to operate semi-autonomously in some examples. For example, one or more commands from the remote controller and/or the mothership aerial vehicle may initiate a sequence of autonomous or semi-autonomous actions by the hybrid UAV 100 in accordance with one or more pre-programmed instructions.

In the exemplary embodiment, the entirety of the control system 108 is shown as being held within the interior compartment 120 of the fuselage 102. But, some components or the entirety of the control system 108 may be located outside of the interior compartment 118 of the fuselage 102. In one example, the entirety of the control system 108 is contained within a housing (not shown) that is mounted to an exterior of the fuselage 102. In another example, one or more cameras, a communication antenna, and/or other components of the control system 108 are mounted to the exterior of the fuselage 102 and/or on or within one or more other structures (e.g., the wings 104, the vertical stabilizer 124, the support legs described above, etc.) of the hybrid UAV 100. Various components of the control system 106 may be housed within a common housing.

Figure 3:
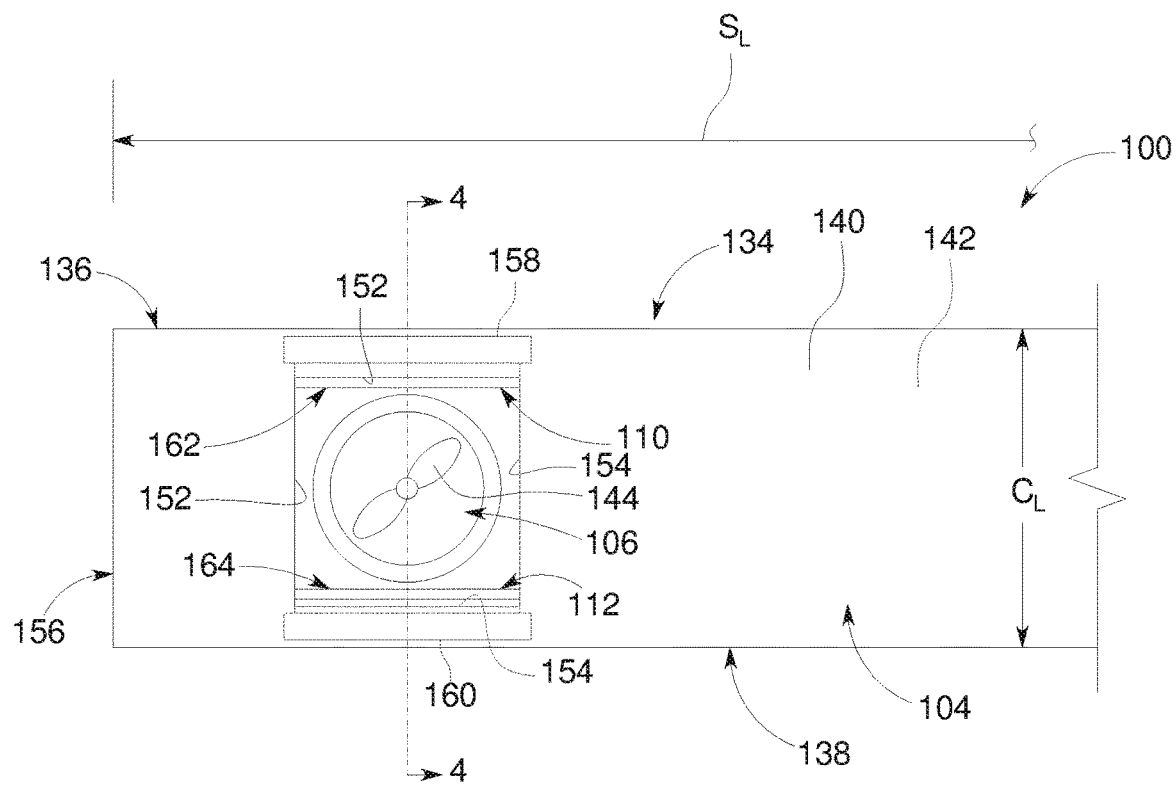
FIG. 3 is a top plan view illustrating one embodiment of a portion of a wing of the hybrid UAV shown in FIGS. 1 and 2 according to principles of the invention.
Figure 4:
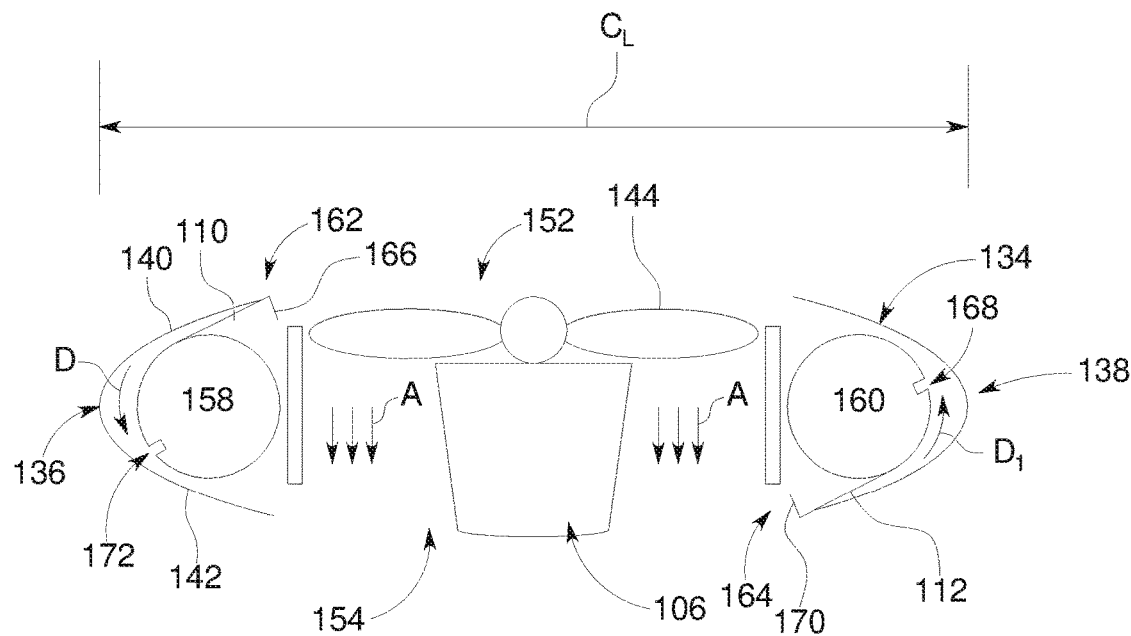
FIG. 4 is a cross section of the wing shown in FIG. 3 taken along line 4-4 of FIG. 3.

Referring now to FIGS. 3 and 4, as described above, the upper and lower doors 110 and 112, respectively, of the wings 104 can be opened to expose the rotor assemblies 106 and thereby transition the hybrid UAV 100 from gliding flight to flight using the rotor assemblies 106. While FIGS. 1 and 2 illustrate the respective upper and lower doors 110 and 112 in the closed position used while the hybrid UAV 100 is gliding, FIGS. 3 and 4 illustrate the upper and lower doors 110 and 112, respectively in an open position used while the hybrid UAV 100 is flown by the rotor assemblies 106.

In the open positions, the rotor assembly 106 is exposed such that the propeller 144 of the rotor assembly 106 is configured to draw air through the body 134 of the wing 104 and thereby generate lift. For example, respective upper and lower openings 152 and 154 are created in the respective upper and lower surfaces 140 and 142 of the wing body 134 when the upper and lower doors 110 and 112, respectively, are moved from the closed positions to the open positions. As indicated by the arrows A in FIG. 4, rotation of the propeller 144 causes air to enter through the upper opening 152, travel down through the thickness of the body 134 of the wing 104, and exit through the lower opening 154, thereby exerting lift on the wing 104.

In the exemplary embodiment of the UAV 100, the respective upper and lower doors 110 and 112 move from the closed positions to the open positions by retracting from the closed positions to the open positions. Any arrangement may be used to retract the doors 110 and 112 to the open positions. For example, the doors 110 and 112 may be generally rigid doors with end portions that are releasably connected to a portion and/or component of the wing 104 to hold the doors 110 and 112 in the closed positions during gliding flight of the hybrid UAV 100. The end portions of the doors 110 and 112 can be released to allow the doors 110 and 112 to retract from the closed positions to the open positions. Each of the doors 110 and 112 may retract inside the body 134 of the wing 104 and/or may retract over an exterior of the body 134 of the wing 104. Moreover, each of the doors 110 and 112 may retract to the open position in any direction, for example along a chord length $C_L$ of the wing 104 away from the leading edge 136, along the chord length $C_L$ of the wing 104 away from the trailing edge 138, along a span length $S_L$ (not visible in FIG. 4) of the wing 104 away from the fuselage 102 (shown in FIGS. 1 and 2), along the span length $S_L$ of the wing 104 away from a tip 156 (not visible in FIG. 4) of the wing 104, etc. The doors 110 and 112 may be retracted to the open position using any suitable actuator (e.g., electric motors, hydraulic actuators, servos, solenoids, screw-type actuators, other linear actuators, etc.), for example controlled by the control system 108 (shown in FIGS. 1 and 2). In another example, the doors 110 and 112 are biased (e.g., spring loaded) toward the open positions using any suitable biasing mechanism (e.g., a spring, etc.) such that when the end portions are released, for example by the control system 108, the doors 110 and 112 retract to the open positions.

In the exemplary embodiment of the UAV 100, the doors 110 and 112 are fabricated from a generally flexible material (e.g., a fabric, a plastic, metal foil, etc.), whether the remainder of the skin of the wing 104 is fabricated from such a generally flexible material. The wing 104 includes reels 158 and 160 that are held within the body 134 of the wing 104 and are operatively connected to the upper and lower doors 110 and 112, respectively, such that the reels 158 and 160 are configured to wind in the respective doors 110 and 112. Specifically, the reels 158 and 160 are configured to wind in the respective doors 110 and 112 to thereby retract the doors 110 and 112 from the closed positions to the open positions. The doors 110 and 112 include respective end portions 162 and 164 that are releasably connected (e.g., using a magnetic latch, an electro-mechanical latch, a mechanical latch, etc.) to a portion and/or a component of the wing 104 (e.g., a portion of the body 134, one of the reels 158 or 160 as described below, etc.) to hold the doors 110 and 112 in the closed positions while the UAV 100 is gliding. The end portions 162 and 164 are released to allow the respective reels 158 and 160 to wind in the respective doors 110 and 112 and expose the rotor assemblies 106 for transitioning the hybrid UAV 100 from gliding flight to flight using the exposed rotor assemblies 106. (The reels 158 and 160 are not shown in FIGS. 1 and 2 for clarity.)

Although the doors 110 and 112 are shown as retracting to the open positions along the chord length $C_L$ of the wing 104 away from the trailing edge 136 and the leading edge 138, respectively, each door 110 and 112 may retract to the open position in any direction along the chord length $C_L$ and in any other direction (e.g., along the span length $S_L$ of the wing 104 in any direction). Although the doors 110 and 112 are shown as retracting in opposite directions, in other examples the doors 110 and 112 retract in the same direction as each other. Each of the reels 158 and 160 may be a motorized reel, for example controlled by the control system 108, or may be biased (e.g., spring loaded) toward the wound in position (i.e., the open position of the respective door 110 or 112) such that when the end portion 162 or 164, respectively, is released, for example by the control system 108, the reel 158 or 160 winds in the respective door 110 or 112. Each of the reels 158 and 160 may be referred to herein as a "first" and/or a "second" reel.

Each of the end portions 162 and 164 of the doors 110 and 112, respectively, may be releasably connected to any portion and/or component of the wing 104 to hold the door 110 or 112 in the closed position. In the exemplary embodiment of the hybrid UAV 100, the end portions 162 and 164 are releasably connected to the reels 160 and 158, respectively. For example, and referring now solely to FIG. 4, the end portion 162 of the upper door 110 includes a hook 166 that nests in a notch 168 in the reel 160 when the upper door 110 is in the closed position. The end portion 164 of the lower door 112 includes a hook 170 that nests in a notch 172 in the reel 158 when the lower door 112 is in the closed position. When the reels 158 and 160 rotate in the opposite directions D and $D_1$, respectively, to wind in the respective door 110 and 112, the hooks 166 and 170 release from the respective notch 168 and 172 to detach the end portions 162 and 164 and thereby allow the doors 110 and 112 to retract to the open positions. Optionally, the reel 158 is a motorized reel while the reel 160 is biased toward the wound position such that rotation of the motorized reel 158 in the direction D, for example by the control system 108, releases the hook 170 of the lower door 112 and enables the bias of the reel 160 to wind in the lower door 112, or vice versa.

Figure 5:
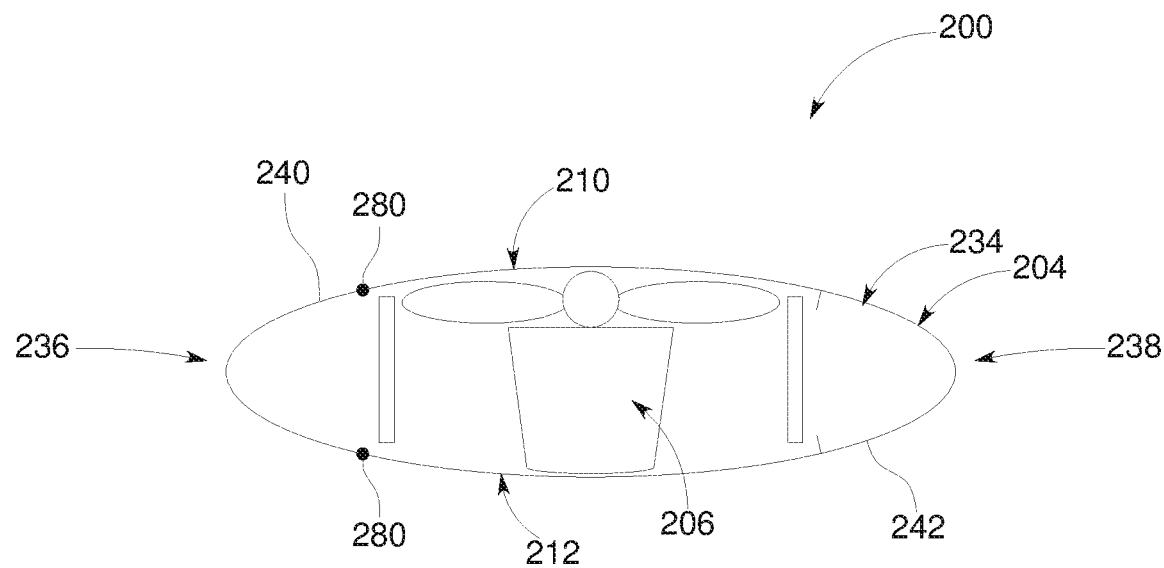
FIG. 5 is a cross-sectional view of another embodiment of an exemplary wing of a hybrid UAV according to principles of the disclosure.
Figure 6:
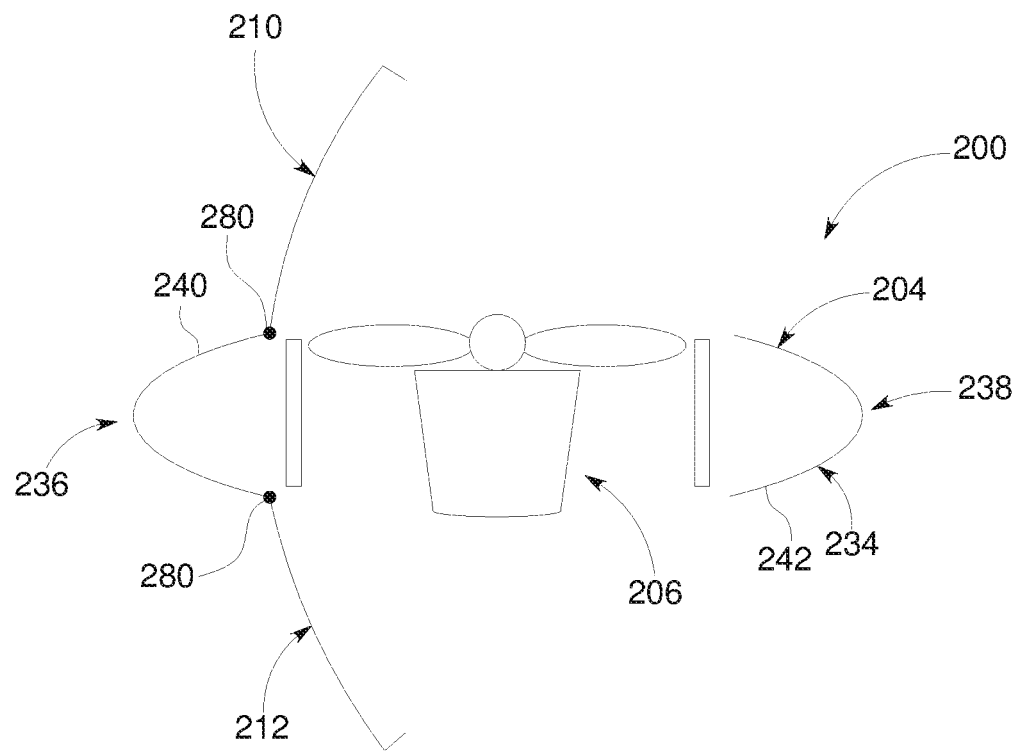
FIG. 6 is another cross-sectional view of the wing shown in FIG. 5 illustrating one embodiment of upper and lower doors in an open position according to principles of the disclosure.

Referring now to FIGS. 5 and 6, another embodiment of a hybrid UAV 200 includes a fuselage (not shown), one or more wings 204 that extend outward from the fuselage, and one or more rotor assemblies 206 held within the wings 204. The hybrid UAV2 100 is capable of both gliding through the air using the wing 204 and flying through the air using the rotor assemblies 206. The wing 204 includes a body 234 that has the shape of an airfoil and extends a chord length from a leading edge 236 to a trailing edge 238. The body 234 includes an upper (i.e., suction) surface 240 and a lower (i.e., pressure) surface 242 that each extend from the leading edge 236 to the trailing edge 238.

The rotor assembly 206 is held within the body 234 of the wing 204 at least partially between the upper surface 240 and the lower surface 242. The wing 204 includes upper doors 210 and lower doors 212 that are moveable between closed positions (shown in FIG. 5) and open positions (shown in FIG. 6). In the closed position shown in FIG. 6, the upper door 210 defines at least a portion of the upper surface 240 of the body 234 of the wing 204 and extends above the rotor assembly 206. The lower door 212 defines at least a portion of the lower surface 242 of the wing body 234 and extends below the rotor assembly 206 in the closed position.

The upper and lower doors 210 and 212, respectively, can be opened from the closed positions to the open positions to expose the rotor assembly 206 and thereby transition the hybrid UAV 200 from gliding flight to flight using the rotor assemblies 206. In the exemplary embodiment of the UAV 200, the respective upper and lower doors 210 are rotatably connected to the body 234 of the wing 204 at hinges 280. The doors 210 and 212 move from the closed positions to the open positions by rotating about the hinges 280. Each of the doors 210 and 212 may rotate to the open position in any direction, for example along the chord length of the wing 204 away from the leading edge 236, along a span length of the wing 204 away from the fuselage, along the span length of the wing 204 away from a tip (not shown) of the wing 204, etc. In the illustrated embodiment of the hybrid UAV 200, each of the doors 210 and 212 rotates from the closed position to the open position along the chord length of the wing 204 in a direction away from the trailing edge 238, as can be seen in FIG. 6. In the exemplary open position shown in FIG. 6, the doors 210 and 212 may act as air brakes that slow the hybrid UAV 200 to facilitate transitioning the hybrid UAV 200 from gliding flight to flight using the rotor assembly 206.

The doors 210 and 212 may be rotated from the closed position to the open position, and vice versa, using any suitable actuator (e.g., electric motors, hydraulic actuators, servos, solenoids, screw-type actuators, other linear actuators, etc.), for example controlled by a control system (e.g., the control system 108 shown in FIGS. 1 and 2) of the hybrid UAV 200. Optionally, the doors 210 and/or 112 are biased (e.g., spring loaded) toward the open positions using any suitable biasing mechanism (e.g., a spring, etc.).

Figure 7:
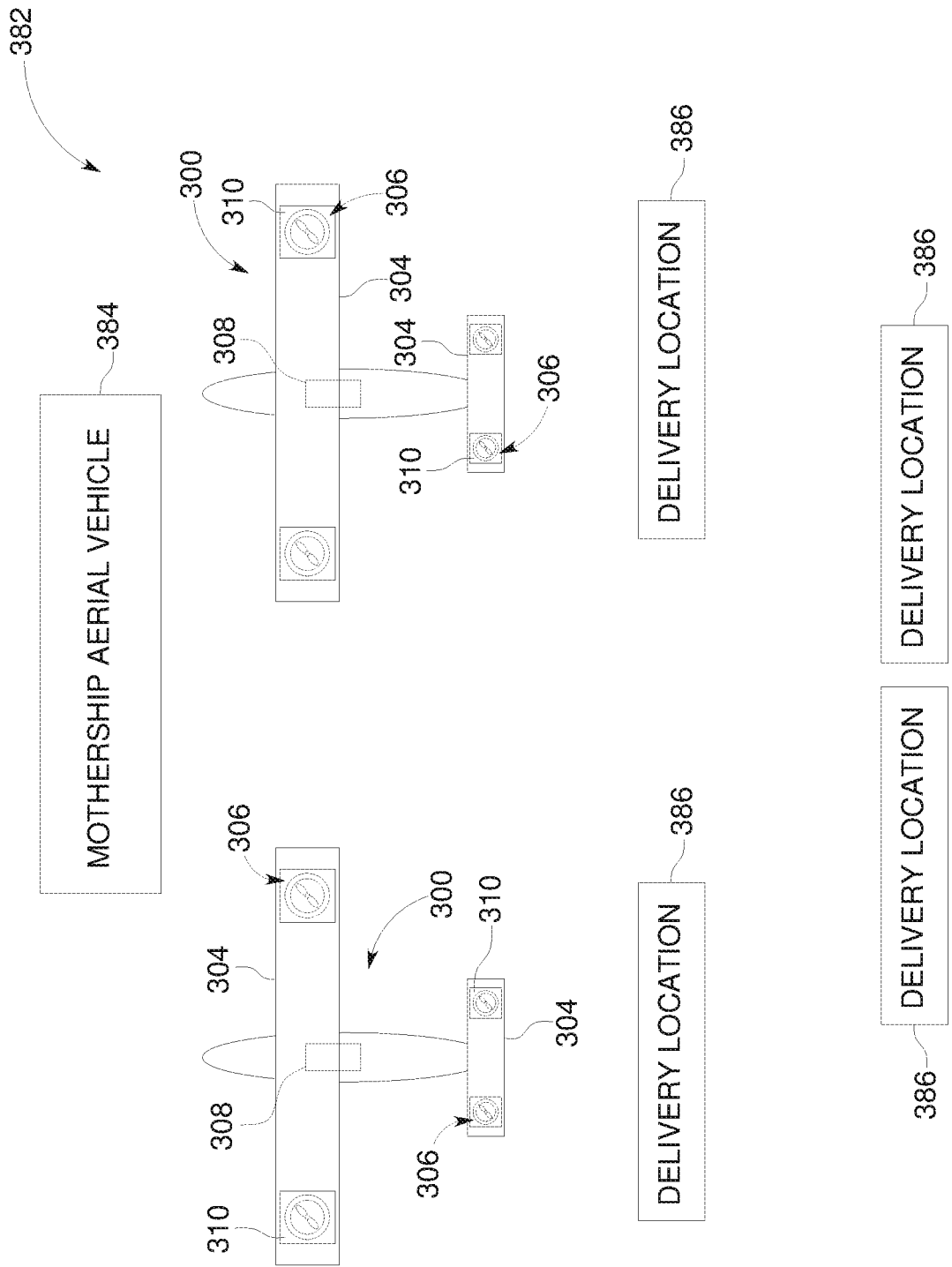
FIG. 7 is a block diagram illustrating one embodiment of a cargo delivery system according to principles of the disclosure.

FIG. 7 is a block diagram illustrating an exemplary embodiment of cargo delivery system 382. The cargo delivery system 382 includes a mothership aerial vehicle 384, one or more hybrid UAVs 300 (e.g., the hybrid UAV 100 shown in FIGS. 1-4 and/or the UAV 200 shown in FIGS. 6 and 7), and a plurality of delivery locations 386. In the exemplary embodiment of mothership aerial vehicle 384, the mothership aerial vehicle 384 is a UAV. But, in other examples, the mothership aerial vehicle 384 is a manned aerial vehicle. The mothership aerial vehicle 384 is configured to hold one or more of the hybrid UAVs 300, for example in an interior compartment (not shown) of the mothership aerial vehicle 384 and/or along an exterior of the mothership aerial vehicle 384. The hybrid UAV(s) 300 are capable of both gliding through the air using wings 304 and flying through the air using rotor assemblies 306. The hybrid UAV(s) 300 are configured to transition from gliding flight to flight using the rotor assemblies 306 by opening upper doors 310 and lower doors (not shown in FIG. 7) of the wings 304 to expose the rotor assemblies 306.

The mothership aerial vehicle 384 is configured to dispatch the hybrid UAV(s) 300 to the delivery locations 386. For example, the mothership aerial vehicle 384 releases a hybrid UAV 300 and the hybrid UAV 300 glides away from the mothership aerial vehicle 384 toward the intended delivery location 386. While gliding, the hybrid UAV 300 transitions from gliding flight to flight using the rotor assemblies 306 by opening the upper doors 310 and the lower doors of the wings 304 to expose the rotor assemblies 306. The hybrid UAV 300 then lands at the delivery location 386 to deliver cargo to the delivery location 386 and/or retrieve cargo from the delivery location 386 for delivery to another destination (e.g., an original source of the cargo, a distribution center, a retail or wholesale business, another business, a residence, a group pickup station, the mothership aerial vehicle 384, etc.).

The hybrid UAV 300 may transition from gliding flight to flight using the rotor assemblies 306 at any location along the flight path of the hybrid UAV 300 from the mothership aerial vehicle 384 to the delivery location 386. For example, the hybrid UAV 300 may transition from gliding flight to flight using the rotor assemblies 306 based on the altitude of the hybrid UAV 300 (e.g., once the hybrid UAV 300 has descended below a threshold altitude, etc.) and/or based on a proximity of the hybrid UAV 300 to the delivery location 386 (e.g., when the hybrid UAV 300 arrives over or within a range of the delivery location 386). In some examples, the hybrid UAV 300 glides for as long as possible, for example to conserve battery power of the hybrid UAV 300.

The mothership aerial vehicle 384 may program a control system 308 of the hybrid UAV 300 with various parameters of the flight plan of the hybrid UAV 300, such as, but not limited to, the flight path, speed, arrival time, and/or the like of the hybrid UAV 300. In some examples, the mothership aerial vehicle 384 may consider various parameters (e.g., weather conditions, time of day, other air traffic along the flight path, the particular delivery location 386, etc.) when determining the programming of the flight path of the hybrid UAV 300. Moreover, the altitude and/or other parameters of the mothership aerial vehicle 384 may determine the maximum travel range of the hybrid UAV 300. In some examples, the mothership aerial vehicle 384 establishes a geo-fence around a flight zone of the hybrid UAVs 300. In addition or alternative to programming the hybrid UAV 300 with one or more parameters of the flight plan of the hybrid UAV 300, the mothership aerial vehicle 384 may at least partially control the hybrid UAV 300 using wireless communication (e.g., radio control, a cellular network, a mesh network, etc.).

In some examples, the control system 308 of the hybrid UAV 300 may be provided with only the minimum of number and/or type of components (e.g., sensors, processors, etc.) necessary for the hybrid UAV 300 to fly to the delivery location 386 (with help from the mothership aerial vehicle 384), for example to reduce the weight and/or power consumption of the hybrid UAV 300 and thereby increase the efficiency of the hybrid UAV 300. In one example, the hybrid UAV 300 may be provided with only a processor, an altimeter, GPS, a radio, and/or an accelerometer.

Figure 8:
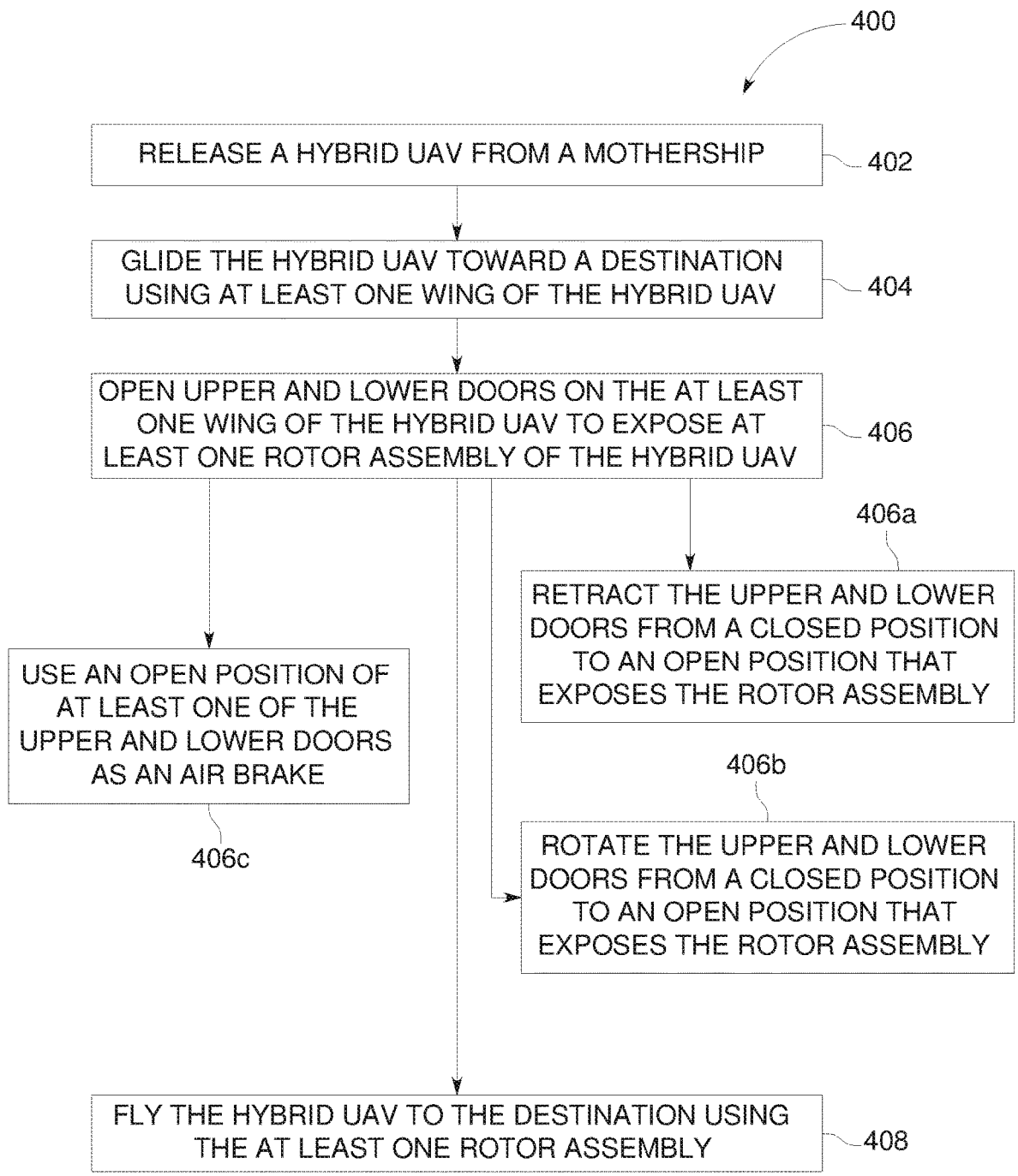
FIG. 8 is an exemplary flowchart illustrating one embodiment of a method for delivering cargo according to principles of the disclosure.

Referring now to FIG. 8, a method 400 for delivering cargo is shown. At operation 402, the method 400 includes releasing a hybrid UAV from a mothership. The hybrid UAV is configured to hold cargo. The method 400 includes gliding, at operation 404, the hybrid UAV toward a destination using at least one wing of the hybrid UAV. At operation 406, the method 400 includes opening upper and lower doors on the least one wing of the hybrid UAV to expose at least one rotor assembly of the hybrid UAV such that the at least one rotor assembly is configured to generate lift. In some examples, opening the upper and lower doors at operation 406 includes retracting, at operation 406a, the upper and lower doors from a closed position to an open position that exposes the rotor assembly. In other examples, opening the upper and lower doors at operation 406 includes rotating, at operation 406b, the upper and lower doors from a closed position to an open position that exposes the rotor assembly. Optionally, opening the upper and lower doors at operation 406 includes using, at operation 406c, an open position of at least one of the upper and lower doors as an air brake.

At operation 408, the method 400 includes flying the hybrid UAV to the destination using the at least one rotor assembly.

ADDITIONAL EXAMPLES

Alternatively, or in addition to the other examples described herein, examples include any combination of the following:

In one aspect, there are provided embodiments of a hybrid unmanned aerial vehicle (UAV). In one example, a hybrid UAV comprises a fuselage configured to hold cargo; at least one wing extending outward from the fuselage, the wing having a body that includes a leading edge, a trailing edge, and upper and lower surfaces that extend from the leading edge to the trailing edge, the body of the wing having the shape of an airfoil such that the wing is configured to generate lift to enable the UAV to glide through the air; at least one rotor assembly held within the body of the wing between the upper and lower surfaces of the wing; and wherein the upper surface of the wing comprises an upper door extending above the rotor assembly and the lower surface of the wing comprises a lower door extending below the rotor assembly, wherein the upper and lower doors are configured to be opened during gliding of the UAV to an open position that exposes the rotor assembly such that the rotor assembly is configured to draw air through the body of the wing and thereby generate lift.

In another example, the upper and lower doors are configured to retract from a closed position to the open position that exposes the rotor assembly.

In some examples, the upper and lower doors are hinged doors that are configured to rotate from a closed position to the open position that exposes the rotor assembly.

In another example, the hybrid UAV further comprises at least one reel held within the body of the wing. The at least one reel is operatively connected to at least one of the upper door and the lower door such that the reel is configured to retract the at least one of the upper door and the lower door from a closed position to the open position by winding in the at least one of the upper door and the lower door.

In still another example, the hybrid UAV further comprises first and second reels held within the body of the wing. The first and second reels are operatively connected to the upper and lower doors, respectively, such that the first and second reels are configured to retract the respective upper and lower doors from closed positions to the open positions by winding in the respective upper and lower doors. One of the first and second reels is motorized and the other of the first and second reels is biased toward a wound position.

In some examples, the hybrid UAV further comprises first and second reels held within the body of the wing. The first and second reels are operatively connected to the upper and lower doors, respectively, such that the first and second reels are configured to retract the respective upper and lower doors from closed positions to the open positions by winding in the respective upper and lower doors. End portions of the upper and lower doors are releasably connected to the second and first reels, respectively.

In one example, the upper and lower doors are hinged doors that are configured to rotate from a closed position to the open position that exposes the rotor assembly. At least one of the upper and lower doors being configured to act as an air brake in the open position.

In another example, the fuselage is configured to hold the cargo within an interior compartment of the fuselage.

In another aspect, there are provided embodiments of a cargo delivery system. In one example, a cargo delivery system includes a mothership aerial vehicle; and a hybrid unmanned aerial vehicle (UAV) configured to be held by the mothership aerial vehicle, the hybrid UAV comprising a fuselage configured to hold cargo and at least one wing extending outward from the fuselage, the wing having a body that includes a leading edge, a trailing edge, and upper and lower surfaces that extend from the leading edge to the trailing edge, the body of the wing having the shape of an airfoil such that the wing is configured to generate lift to enable the UAV to glide through the air when released from the mothership aerial vehicle, at least one rotor assembly being held within the body of the wing between the upper and lower surfaces of the wing, wherein the upper surface of the wing comprises an upper door extending above the rotor assembly and the lower surface of the wing comprises a lower door extending below the rotor assembly, wherein the upper and lower doors are configured to be opened during gliding of the UAV to an open position that exposes the rotor assembly such that the rotor assembly is configured to draw air through the body of the wing and thereby generate lift.

In one example, the upper and lower doors are configured to retract from a closed position to the open position that exposes the rotor assembly.

In another example, the upper and lower doors are hinged doors that are configured to rotate from a closed position to the open position that exposes the rotor assembly.

In some examples, the hybrid UAV further comprises at least one reel held within the body of the wing, the at least one reel being operatively connected to at least one of the upper door and the lower door such that the reel is configured to retract the at least one of the upper door and the lower door from a closed position to the open position by winding in the at least one of the upper door and the lower door.

In still another example, the hybrid UAV further comprises first and second reels held within the body of the wing, the first and second reels being operatively connected to the upper and lower doors, respectively, such that the first and second reels are configured to retract the respective upper and lower doors from closed positions to the open positions by winding in the respective upper and lower doors, wherein one of the first and second reels is motorized and the other of the first and second reels is biased toward a wound position.

In some examples, the hybrid UAV further comprises first and second reels held within the body of the wing, the first and second reels being operatively connected to the upper and lower doors, respectively, such that the first and second reels are configured to retract the respective upper and lower doors from closed positions to the open positions by winding in the respective upper and lower doors, wherein end portions of the upper and lower doors are releasably connected to the second and first reels, respectively.

In another example, the upper and lower doors are hinged doors that are configured to rotate from a closed position to the open position that exposes the rotor assembly, at least one of the upper and lower doors being configured to act as an air brake in the open position.

In yet another example, the fuselage is configured to hold the cargo within an interior compartment of the fuselage.

In another aspect, there may be disclosed a method for delivering cargo. In one example, the method comprises releasing a hybrid unmanned aerial vehicle (UAV) from a mothership, the hybrid UAV being configured to hold cargo; gliding the hybrid UAV toward a destination using at least one wing of the hybrid UAV; opening upper and lower doors on the at least one wing of the hybrid UAV to expose at least one rotor assembly of the hybrid UAV such that the at least one rotor assembly is configured to generate lift; and flying the hybrid UAV to the destination using the at least one rotor assembly.

In another example, opening the upper and lower doors comprises retracting the upper and lower doors from a closed position to an open position that exposes the rotor assembly.

In some examples, opening the upper and lower doors comprises rotating the upper and lower doors from a closed position to an open position that exposes the rotor assembly.

In another example, opening the upper and lower doors comprises using an open position of at least one of the upper and lower doors as an air brake.

At least a portion of the functionality of the various elements in the figures may be performed by other elements in the figures, or an entity (e.g., processor, web service, server, application program, computing device, etc.) not shown in the figures.

While the aspects of the disclosure have been described in terms of various examples with their associated operations, a person skilled in the art would appreciate that a combination of operations from any number of different examples is also within scope of the aspects of the disclosure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A hybrid unmanned aerial vehicle (UAV) comprising:
a fuselage configured to hold cargo;
at least one wing extending outward from the fuselage, the wing having a body that includes a leading edge, a trailing edge, and upper and lower surfaces that extend from the leading edge to the trailing edge, the body of the wing having a shape of an airfoil such that the wing is configured to generate lift to enable the UAV to glide through air;
at least one rotor assembly held within the body of the wing between the upper and lower surfaces of the wing;
wherein the upper surface of the wing comprises an upper door extending above the rotor assembly and the lower surface of the wing comprises a lower door extending below the rotor assembly, wherein the upper and lower doors are configured to open during gliding of the UAV to an open position that exposes the rotor assembly such that the rotor assembly is configured to draw air through the body of the wing and thereby generate lift; and
first and second reels held within the body of the wing, the first and second reels operatively connected to the upper and lower doors, respectively, such that the first and second reels are configured to retract the respective upper and lower doors from closed positions to the open position by winding in the respective upper and lower doors, wherein one of the first and second reels is motorized and the other of the first and second reels is biased toward a wound position.

2. The hybrid UAV of claim 1, wherein the upper and lower doors are configured to retract from a closed position to the open position that exposes the rotor assembly.

3. The hybrid UAV of claim 1, wherein the upper and lower doors are hinged doors that are configured to rotate from a closed position to the open position that exposes the rotor assembly.

4. The hybrid UAV of claim 1, wherein end portions of the upper and lower doors are releasably connected to the second and first reels, respectively.

5. The hybrid UAV of claim 1, wherein the upper and lower doors are hinged doors that are configured to rotate from a closed position to the open position that exposes the rotor assembly, at least one of the upper and lower doors configured to act as an air brake in the open position.

6. The hybrid UAV of claim 1, wherein the fuselage is configured to hold the cargo within an interior compartment of the fuselage.

7. A cargo delivery system comprising:
a mothership aerial vehicle; and
a hybrid unmanned aerial vehicle (UAV) configured to be held by the mothership aerial vehicle, the hybrid UAV comprising a fuselage configured to hold cargo and at least one wing extending outward from the fuselage, the wing having a body that includes a leading edge, a trailing edge, and upper and lower surfaces that extend from the leading edge to the trailing edge, the body of the wing having a shape of an airfoil such that the wing is configured to generate lift to enable the UAV to glide through air when released from the mothership aerial vehicle, at least one rotor assembly held within the body of the wing between the upper and lower surfaces of the wing, wherein the upper surface of the wing comprises an upper door extending above the rotor assembly and the lower surface of the wing comprises a lower door extending below the rotor assembly, wherein the upper and lower doors are configured to open during gliding of the UAV to an open position that exposes the rotor assembly such that the rotor assembly is configured to draw air through the body of the wing and thereby generate lift; and first and second reels held within the body of the wing, the first and second reels operatively connected to the upper and lower doors, respectively, such that the first and second reels are configured to retract the respective upper and lower doors from closed positions to the open positions by winding in the respective upper and lower doors, wherein one of the first and second reels is motorized and the other of the first and second reels is biased toward a wound position.

8. The cargo delivery system of claim 7, wherein the upper and lower doors are configured to retract from a closed position to the open position that exposes the rotor assembly.

9. The cargo delivery system of claim 7, wherein the upper and lower doors are hinged doors that are configured to rotate from a closed position to the open position that exposes the rotor assembly.

10. The cargo delivery system of claim 7, wherein end portions of the upper and lower doors are releasably connected to the second and first reels, respectively.

11. The cargo delivery system of claim 7, wherein the upper and lower doors are hinged doors that are configured to rotate from a closed position to the open position that exposes the rotor assembly, at least one of the upper and lower doors configured to act as an air brake in the open position.

12. The cargo delivery system of claim 7, wherein the fuselage is configured to hold the cargo within an interior compartment of the fuselage.

13. A method for delivering cargo, the method comprising:
releasing a hybrid unmanned aerial vehicle (UAV) from a mothership, the hybrid UAV configured to hold cargo;
gliding the hybrid UAV toward a destination using at least one wing of the hybrid UAV;
opening upper and lower doors on the least one wing of the hybrid UAV to expose at least one rotor assembly of the hybrid UAV such that the at least one rotor assembly is configured to generate lift, wherein first and second reels held within a body of the at least one wing are operatively connected to the upper and lower doors, respectively, such that the first and second reels are configured to retract the respective upper and lower doors from closed positions to the open positions by winding in the respective upper and lower doors, wherein one of the first and second reels is motorized and the other of the first and second reels is biased toward a wound position; and
flying the hybrid UAV to the destination using the at least one rotor assembly.

14. The method of claim 13, wherein opening the upper and lower doors comprises retracting the upper and lower doors from a closed position to an open position that exposes the rotor assembly.

15. The method of claim 13, wherein opening the upper and lower doors comprises rotating the upper and lower doors from a closed position to an open position that exposes the rotor assembly.

16. The method of claim 13, wherein opening the upper and lower doors comprises using an open position of at least one of the upper and lower doors as an air brake.

\* \* \* \* \*